United States Patent [19]

Talbert et al.

[11] Patent Number: 5,486,496
[45] Date of Patent: Jan. 23, 1996

[54] GRAPHITE-LOADED SILICON CARBIDE

[75] Inventors: Lloyd G. Talbert, Alexander; Stephen M. Brazil, Benton, both of Ark.

[73] Assignee: Alumina Ceramics Co. (ACI), Benton, Ark.

[21] Appl. No.: 259,916

[22] Filed: Jun. 10, 1994

[51] Int. Cl.$^6$ ................................................ C04B 35/577
[52] U.S. Cl. ................................................ 501/90; 501/99
[58] Field of Search ........................................ 501/90, 99

[56] References Cited

U.S. PATENT DOCUMENTS

| | | | |
|---|---|---|---|
| 2,938,807 | 5/1960 | Anderson | 501/90 X |
| 4,019,913 | 4/1977 | Weaver et al. | 106/44 |
| 4,041,117 | 8/1977 | Prochazka | 264/63 |
| 4,524,138 | 6/1985 | Schwetz et al. | 501/90 |
| 4,525,461 | 6/1985 | Boecker et al. | 501/90 |
| 4,536,449 | 8/1985 | Kennedy et al. | 428/408 |
| 4,690,909 | 9/1987 | Okuno et al. | 501/90 |
| 4,692,418 | 9/1987 | Boecker et al. | 501/90 |
| 4,701,426 | 10/1987 | Okuno et al. | 501/90 |
| 4,925,815 | 5/1990 | Tani et al. | 501/90 |
| 4,942,145 | 7/1990 | Moehle et al. | 501/90 |
| 5,135,893 | 8/1992 | Dohi et al. | 501/90 X |
| 5,246,897 | 9/1993 | Ono et al. | 501/101 |
| 5,422,322 | 6/1995 | Chen et al. | 501/90 |

FOREIGN PATENT DOCUMENTS 2234924  1/1974  Germany ................................ 501/90

*Primary Examiner*—Karl Group
*Attorney, Agent, or Firm*—Sheridan Ross & McIntosh

[57] ABSTRACT

A silicon carbide ceramic body having a high degree of lubricity as a result of large graphite inclusions in the body. The graphite inclusions have an average size of at least about 100 micrometers. The graphite-loaded silicon carbide component is preferably formed by spray drying graphite particles independent of the silicon carbide, blending the graphite agglomerates and silicon carbide to form a raw batch, forming the raw batch into a green body, and sintering the green body to produce a graphite-loaded silicon carbide ceramic body having good density and good strength.

13 Claims, 1 Drawing Sheet

1

GRAPHITE-LOADED SILICON CARBIDE

FIELD OF THE INVENTION

The present invention relates generally to ceramic materials and more specifically to graphite-loaded silicon carbide ceramic bodies, and processes for making the same.

BACKGROUND OF THE INVENTION

Silicon carbide ceramics are used in a variety of industrial applications requiring good corrosion resistance and wear resistance, particularly at elevated temperatures. Polycrystalline silicon carbide is typically solid-state sintered with additions of sintering aids such as carbon and boron, or is formed by a reaction bonding process wherein silicon metal is reacted with a carbon source to form silicon carbide.

However, silicon carbide often does not have sufficient lubricity for many applications. Therefore, the use of silicon carbide in such applications has been limited. One possible solution to this problem is the use of graphite-loaded silicon carbide wherein the graphite provides improved lubricity at elevated temperatures. Because of the lubricity of graphite-loaded silicon carbide, graphite-loaded silicon carbide components are useful in a variety of mechanical applications.

Graphite-loaded silicon carbide components have been produced by reaction-bonding processes and by solid-state sintering processes. For example, a reaction bonding process to produce graphite-loaded silicon carbide components is disclosed in U.S. Pat. No. 4,536,449 by Kennedy et al. and issued on Aug. 20, 1985. Kennedy et al. disclose a process wherein silicon carbide powder is mixed with colloidal graphite powder and graphite particles having a size of 75 to 300 micrometers. The mixture is formed into a green body which is sintered at a temperature of 1400° C. to 1650° C. in the presence of molten silicon which reacts with the colloidal graphite, converting it to silicon carbide.

Graphite-loaded silicon carbide bodies produced by reaction bonding typically have a low density and include approximately 2 to 20 weight percent free silicon metal. For example, Kennedy et al. disclose that a continuous silicon carbide matrix is formed in a substantially continuous free silicon phase. Consequently, it is believed that the components will have poor strength at temperatures near the melting point of silicon (e.g., temperatures of about 1410° C.). In addition, it can be difficult to control the final amount of free graphite in the sintered body due to the reaction of the graphite with the silicon metal.

A direct (solid-state) sintering process to produce graphite-loaded silicon carbide bodies is disclosed in U.S. Pat. No. 4,525,461 by Boecker et al. and issued on Jun. 25, 1985. Boecker et al. disclose a process wherein silicon carbide particles having a maximum particle size of 8 micrometers are blended with graphite powder having an average particle size not in excess of 8 micrometers. Sintering aids such as aluminum, boron, beryllium, or compounds thereof, and either a temporary binder or an organic solvent such as acetone or heptane, are also added to the batch, along with amorphous carbon. After blending, the mixture is dried, shaped and pressureless sintered to produce a graphite-loaded silicon carbide body.

Another process useful for producing graphite-loaded silicon carbide is disclosed in U.S. Pat. No. 4,942,145 by Moehle et al. and issued on Jul. 17, 1990. Moehle et al. disclose a process wherein silicon carbide particles having a maximum particle size of 5 micrometers are blended with graphite particles having a particle size of less than about 100 micrometers and preferably from about 0.1 to 10 micrometers. A polysilazane binder and an inorganic solvent are blended with the silicon carbide and graphite. After drying, the mixture is shaped and pyrolyzed at 1200° C. to 1450° C. to produce a graphite-loaded silicon carbide body. In a disclosed example, the sintered body has a density of 2.18 g/cc and a bending strength of 15.9 kg/mm$^2$ (22.6 ksi).

U.S. Pat. Nos. 4,690,909 and 4,701,426, both by Okuno et al., issued on Sep. 1, 1987 and Oct. 20, 1987, respectively. These patents disclose a process for making a silicon carbide and graphite composite material by adding carbon black to silicon carbide. The carbon black is converted into graphite during sintering wherein the resulting graphite exists as a secondary phase segregated along the grain boundaries of the silicon carbide grains. It is disclosed that the average grain size of the graphite is not more than about 3 micrometers.

Graphite-loaded silicon carbide components produced by direct sintering processes disclosed in the prior art are believed to have insufficient lubricity for many applications. In such applications, insufficient lubricity will not adequately reduce the coefficient of friction between the component and the mating surface to prevent the generation of excessive amounts of heat when the component is in motion. Excessive heat generation can cause the component to fail prematurely.

There is a need for a graphite-loaded silicon carbide component having a high degree of lubricity. There is a further need for a graphite-loaded silicon carbide component having good sintered density and strength. There is a further need for a graphite-loaded silicon carbide component that maintains good strength at elevated temperatures. There is a further need for a graphite-loaded silicon carbide component having good lubricity that is substantially free of unreacted silicon.

SUMMARY OF THE INVENTION

The present invention generally relates to graphite-loaded silicon carbide ceramic bodies that include graphite inclusions having an average size of at least about 100 micrometers. The present invention also relates to raw batches and green bodies useful for producing such ceramic bodies and processes for producing such bodies.

According to one aspect of the present invention, a sintered ceramic body includes at least about 5 weight percent graphite inclusions having an average size of at least about 100 micrometers, at least about 80 weight percent silicon carbide, and less than about 0.5 weight percent unreacted silicon metal. Preferably, the sintered ceramic body includes less than about 0.2 weight percent silicon metal.

In one preferred embodiment of this aspect of the invention, the sintered ceramic body includes from about 5 weight percent to about 10 weight percent graphite inclusions. In another embodiment, at least about 50 percent of the graphite inclusions have a size of at least about 100 micrometers. Preferably, the graphite inclusions have an average size of from about 100 micrometers to about 150 micrometers. In another embodiment, the ceramic body includes at least about 85 weight percent silicon carbide. The density of the sintered ceramic body is preferably at least about 2.8 g/cc (grams per cubic centimeter) and the sintered body preferably has a tensile strength of at least about 180 MPa. The sintered ceramic body is useful for a number of applications and is particularly useful as a pump seal.

According to another aspect of the present invention, a raw batch useful for producing a sintered ceramic body is provided. The raw batch can include at least about 5 parts by weight graphite agglomerates, wherein at least about 50 percent of the agglomerates have a size of at least about 100 micrometers, and at least about 80 parts by weight silicon carbide.

In a preferred embodiment of this aspect of the invention, the raw batch includes from about 5 parts by weight to about 10 parts by weight graphite agglomerates. The graphite agglomerates preferably have an average size of from about 100 micrometers to about 150 micrometers and are preferably formed by spray drying. The graphite agglomerates are preferably substantially free of silicon carbide particles to ensure good lubricity. The silicon carbide can comprise agglomerates having an average size of from about 50 micrometers to about 200 micrometers. The raw batch can also include sintering aids, such as those selected from the group consisting of boron, carbon and mixtures thereof. The raw batch can also include other additives, such as binders or other forming aids.

According to another aspect of the present invention, a green body useful for producing a sintered graphite-loaded ceramic body is provided. The green body can include at least about 5 parts by weight graphite agglomerates having an average size of at least about 100 micrometers and at least about 80 parts by weight silicon carbide. Preferably, the green body includes from about 5 parts by weight to about 10 parts by weight graphite agglomerates and at least about 50 percent of the graphite agglomerates have a size of at least about 100 micrometers. The green body preferably has a density of from about 1.8 g/cc to about 2.3 g/cc.

Yet another aspect of the present invention provides a process for producing a sintered ceramic body. The process preferably includes the steps of providing agglomerates of graphite having an average size of at least about 100 micrometers, providing silicon carbide powder, blending the agglomerates of graphite and the silicon carbide to form a raw batch, forming the blend of graphite agglomerates and silicon carbide particles into a green body having a desired shape and sintering the green body to produce a sintered ceramic body that includes silicon carbide having graphite inclusions dispersed therethrough. The graphite agglomerates are preferably formed by spray drying a slurry that includes graphite powder, a carrier fluid, and a binder. Preferably, the slurry includes from about 10 weight percent to about 40 weight percent graphite. The silicon carbide can also be spray dried and can be in the form of agglomerates having a size of from about 50 micrometers to about 200 micrometers. The graphite agglomerates may require grading to yield the desired size distribution in the blending step. The blending step is preferably conducted in the substantial absence of a liquid to avoid breakup of the agglomerates. The sintering step preferably includes heating the green body to a temperature of from about 2050° C. to about 2200° C. Preferably, the sintered body has a density of at least about 2.6 g/cc, more preferably at least about 2.8 g/cc.

The various aspects and embodiments of the present invention provide distinct advantages over graphite-loaded silicon carbide ceramic bodies disclosed in the prior art. The graphite-loaded silicon carbide component of the present invention has increased lubricity compared to existing graphite-loaded silicon carbide components while maintaining good strength. The increased lubricity is believed to result in part from the larger size of the graphite inclusions in the graphite-loaded silicon carbide body. The size of the inclusions results from the use of graphite agglomerates having an average size of at least about 100 micrometers. The graphite inclusions typically have substantially the same size distribution as the graphite agglomerates in the raw batch.

The sintered ceramic bodies according to the present invention also possess good sintered density and good strength. Further, there is little or no unreacted silicon metal in the sintered body to degrade the high temperature properties.

DETAILED DESCRIPTION

Figure 1:
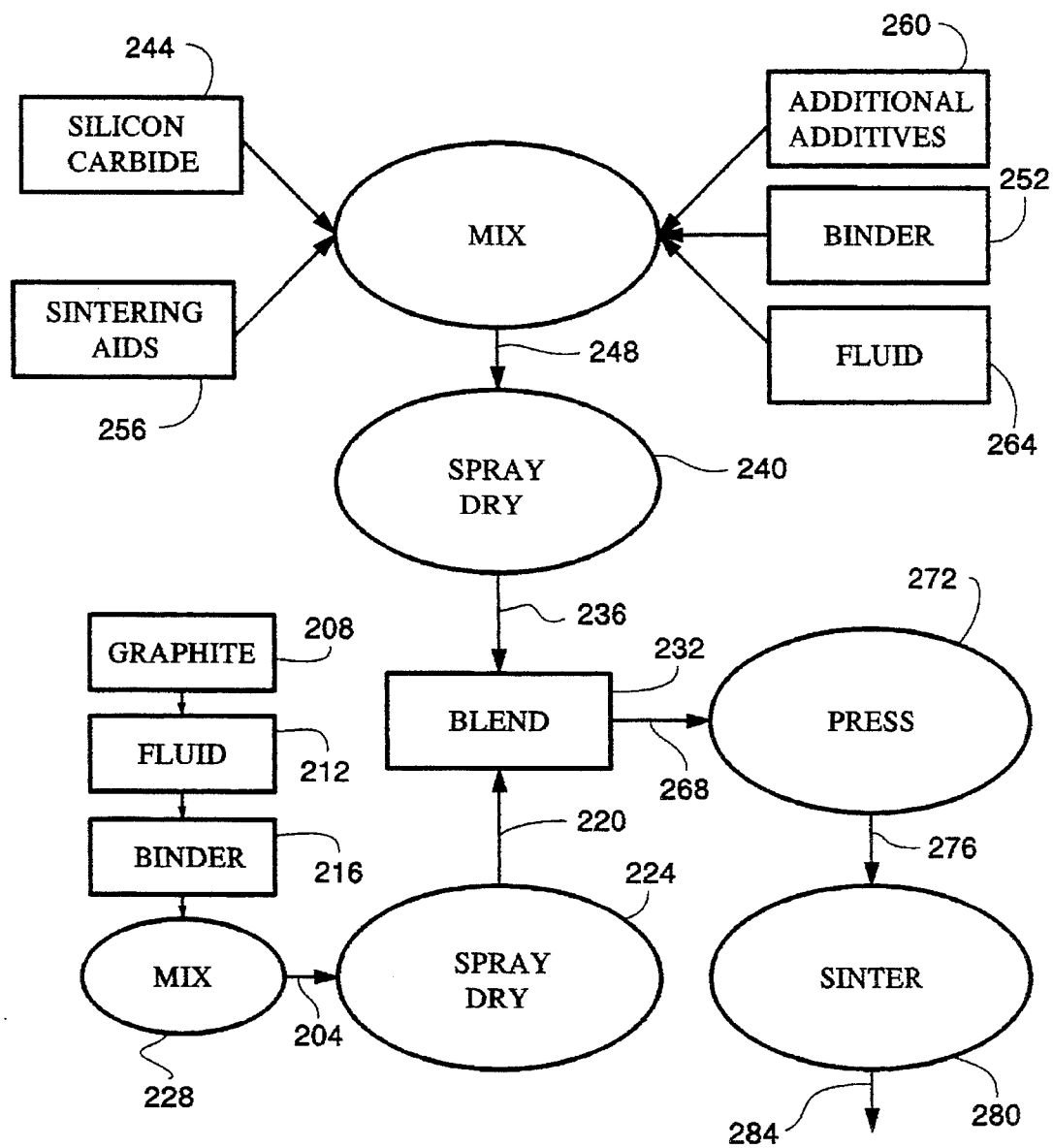
FIG. 1 illustrates a schematic flow chart of a process for making a graphite-loaded silicon carbide ceramic body according to the present invention.

The present invention relates to graphite-loaded silicon carbide (SiC) ceramic bodies having a high degree of lubricity, good density and good strength. The lubricity of the graphite-loaded silicon carbide bodies makes components fabricated from the bodies suitable for use in a wide variety of applications. Such applications can include use as mechanical seal rings, pump seals, plungers, bearings, and extrusion dies. In such applications, the high degree of lubricity of the graphite-loaded silicon carbide component reduces the coefficient of friction between the component and the mating surfaces contacting the component during operation.

The high degree of lubricity of the sintered body according to the present invention results in part from the size distribution and concentration of the graphite inclusions. The graphite-loaded silicon carbide body incorporates large graphite inclusions among the smaller silicon carbide grains. The graphite inclusions are generally oblong due to the uniaxial pressure applied to form the raw batch containing the spherical agglomerates of graphite into a green body.

According to the present invention, at least about 50 percent, more preferably at least about 70 percent, and most preferably at least about 90 percent of the graphite inclusions have a size of at least about 100 micrometers. The average size of the graphite inclusions is preferably at least about 100 micrometers, more preferably from about 100 to about 150 micrometers, and most preferably from about 100 to about 130 micrometers. As used herein, the term "size" refers to the diameter of the agglomerate, inclusion, particle or grain. The diameter of an oblong object (e.g. an inclusion) is measured by averaging the length of the major axis and the minor axis of the object.

Graphite inclusions having the preferred size according to the present invention can reduce the frictional drag on a mating surface. If the average size of the graphite inclusion drops significantly below about 100 micrometers, the amount of lubricity can significantly decrease. However, too large of an agglomerate size may adversely affect the strength and integrity of the sintered ceramic body.

The graphite inclusions according to the present invention can also act as a liquid reservoir in the event that the graphite inclusion is inadvertently pulled out of the ceramic matrix. It is believed that the graphite particles in prior art graphite-loaded silicon carbide are not sufficiently large to permit lubricating liquids to penetrate the pore if the graphite is pulled out of the matrix.

The size of the graphite inclusions results from the use of large graphite agglomerates in the raw batch that is used to produce the sintered body. Generally, the size distribution of the graphite agglomerates is substantially the same as the size distribution desired for the graphite inclusions. To produce sufficiently large graphite inclusions, the graphite agglomerates are preferably formed by spray drying a graphite-containing slurry. Agglomerates of graphite particles are preferred, as opposed to large graphite crystals, since it has been found that large graphite crystals can cause significant lamination in the sintered ceramic body. Agglomerates are more compressible and therefore do not have as great a tendency to cause laminations in the ceramic body.

The graphite agglomerates are preferably formed independent of the silicon carbide particles. The graphite agglomerates should be formed separately to insure that substantially no silicon carbide is present in the graphite agglomerates to substantially interfere with the lubricating qualities of the graphite. If the graphite agglomerates contain substantial amounts of silicon carbide, the lubricity characteristics of the sintered body can be adversely affected.

FIG. 1 is a flowchart illustrating a process useful for producing a graphite-loaded silicon carbide ceramic body according to the present invention. Referring to FIG. 1, a graphite-containing slurry 204 is formed by mixing graphite 208 and a fluid 212. The graphite 208 is preferably in the form of a powder and preferably has an average particle size of from about 1 micrometer to about 10 micrometers. For example, a low expansion grade graphite having an average particle size of about 3 to 4 micrometers can advantageously be used.

The fluid 212 preferably includes a volatile liquid. As used herein, "volatile liquid" refers to a liquid that evaporates at temperatures of about 100° C. or lower. Preferably, the liquid is selected from water, alcohol (e.g., ethanol, methanol or propanol), or mixtures thereof.

A binder 216 or similar substance can also be included in the graphite-containing slurry 204 to assist in the formation of the graphite agglomerates 220. The binder 216 should be relatively fluid and miscible at low temperatures, such as room temperature, and should gel or set at an elevated temperature, such as the temperature of the graphite-containing slurry 204 during the spray drying step 224. The binder 216 is preferably an organic binder, such as polyethylene glycol (PEG), or polyvinyl alcohol (PVA) or combinations thereof. For example, polyethylene glycol, an example of which is sold under the trademark "CARBOWAX" by Union Carbide of Danbury, Conn., can advantageously be used. The concentration of the binder 216 in the graphite-containing fluid 212 is preferably from about 1 to about 10 parts by weight, and more preferably from about 1 to about 8 parts by weight. Other possible additives to the spray dry batch can include a dispersion agent, such as "TAMOL-SN" which is available from Rohm & Haas of Philadelphia, Pa., ammonia to adjust the pH, and "NIGROSINE," a dispersion agent available from Grapho Colloids.

In the mixing step 228, the graphite 208 and the fluid 212 are combined to form a substantially homogenous graphite-containing slurry 204 by known methods, such as the use of a ball mill, a blender, or other mixing apparatus.

The concentration of graphite 208 in the graphite-containing slurry 204 depends upon the desired viscosity of the graphite-containing slurry 204 in the spray drying step 224 and the desired size distribution of the graphite agglomerates 220. For efficient atomization in the spray drying step, the preferred viscosity of the graphite-containing slurry 204 is from about 500 centipoise to about 1200 centipoise. Preferably, the graphite concentration in the graphite-containing slurry 204 is from about 10 weight percent to about 40 weight percent and more preferably from about 20 weight percent to about 30 weight percent.

According to the present invention, it is preferred to form the graphite-containing slurry 204 into a dispersion of graphite agglomerates using a spray dryer. Spray drying is the process of spraying a slurry into a warm drying medium to rapidly evaporate the liquid and produce nearly spherical powder granules (agglomerates) that are relatively homogenous in shape and size.

In the spray drying step 224, the graphite-containing slurry 204 is atomized to form droplets. The droplet size should be sufficient to produce the desired size distribution of graphite agglomerates 220. The graphite-containing slurry 204 may be atomized by any suitable device, such as a spray nozzle. The fluid 212 in the droplets is then vaporized in the spray dryer to form graphite agglomerates 220. To vaporize the fluid 212 from the slurry 204, the graphite-containing slurry 204 is rapidly heated in the spray dryer to a temperature above the boiling point of the fluid 212. When water is the predominant liquid, the temperature of the spray-dryer is preferably at least about 400° F. (205° C.), more preferably at least about 450° F. (232° C.). The slurry can also be preheated before atomization.

After spray drying 224, the dry graphite agglomerates 220 can be collected by known methods. For example, the agglomerates can be collected in a suitable vessel, such as a drum, and periodically or continuously removed.

As an alternative to spray drying, the dry materials (e.g., graphite and binder) can be pelletized to form graphite agglomerates of the desired size. Also, a graphite-containing slurry can be dropped onto a bed of absorbent material to form agglomerates. In this embodiment, a slurry is forced through a metering hole to form a droplet. The droplet falls onto a conveyor containing a porous material, such as ground rubber. The conveyor then passes through an area which is heated to evaporate the liquid and the agglomerates are then collected by using a screen to separate the dry ceramic agglomerates from the porous material.

After formation, the graphite agglomerates 220 can be passed through a screen to yield the desired size distribution of agglomerates. Preferably, the graphite agglomerates 220 are separated using a screen having an aperture size ranging from about 100 to about 170 Tyler mesh (88 to 149 micrometers) with the collected agglomerates (e.g., larger than about 88 to 149 micrometers) being used to form the blend 232, and the undersized particles optionally being recycled as graphite 208. The graphite inclusion size distribution will be substantially the same as the size distribution of the graphite agglomerates 220. Preferably, at least about 50 percent, more preferably at least about 70 percent of the agglomerates have a size of at least about 100 micrometers and the average size of the agglomerates is preferably from about 100 micrometers to about 150 micrometers.

Silicon carbide powder 236 is then blended with the graphite agglomerates. In a preferred embodiment, silicon carbide-containing agglomerates 236 are formed independently of the graphite agglomerates 220, preferably by spray drying 240 a mixture that includes silicon carbide 244. The silicon carbide-containing slurry 248 can also include a binder 252 which is relatively fluid at low temperatures, but that gels or sets at the spray drying temperature. Preferred binders 252 can be selected from methyl cellulose, butyl stearate, polyethylene glycol, and mixtures thereof. The binder 252 preferably has a concentration in the silicon carbide-containing slurry 248 ranging from about 1 weight percent to about 10 weight percent.

Other additives can be used in the silicon carbide-containing slurry 248. For example, those skilled in the art will recognize that the silicon carbide-containing slurry 248 can include a sintering aid 256, such as from about 0.1 to about 5 weight percent boron. Additionally, up to about 2 weight percent of a carbon source can also be added as a sintering aid. Preferably, the carbon source is added in the form of a resin. Additional additives 260, such as about 0.5 weight percent of glycerine or aluminum stearate, to provide lubricity during the compaction process, and about 0.5 weight percent of a plasticizer, such as polyethylene glycol or zinc stearate can also be included.

According to a preferred embodiment of the present invention, the sintered graphite-loaded silicon carbide body is formed substantially in accordance with U.S. Pat. No. 4,041,117 by Prochazka, issued Aug. 9, 1977, which is incorporated by reference herein in its entirety. Accordingly, the silicon carbide powder 244 preferably has a particle size of from about 1 micrometer to about 10 micrometers. The silicon carbide powder is predominantly beta-phase silicon carbide, preferably at least about 95 percent beta-phase silicon carbide powder. The remaining silicon carbide powder is alpha-phase silicon carbide powder, which is referred to as the seed powder.

After spray drying 240, the silicon carbide agglomerates 236 can be collected and, if necessary, screened to produce the desired size distribution. Preferably, at least about 75 percent, more preferably about 85 percent, and most preferably about 95 percent of the silicon carbide agglomerates 236 have a size ranging from about 10 micrometers to about 400 micrometers, more preferably from about 50 micrometers to about 200 micrometers. The average size of the silicon carbide agglomerates 236 should range from about 25 micrometers to about 350 micrometers. The silicon carbide is preferably formed into agglomerates to insure the homogeneity of the mixture, and to ensure that the grains of silicon carbide are coated with binder. Agglomerates also flow well to easily fill die cavities. Alternatively, many manufacturers supply silicon carbide in a form that is ready to press into a green body.

The graphite agglomerates 220 and silicon carbide agglomerates 236 are blended 232 to form a raw batch 268. Preferably, the silicon carbide agglomerates 236 and the graphite agglomerates 220 are mixed together in the substantial absence of a liquid. The presence of a liquid during mixing may use the graphite agglomerates 220 and/or silicon carbide agglomerates 236 to break up.

The amount of graphite agglomerates 220 mixed with the silicon carbide agglomerates 236 to form a raw batch depends upon the desired degree of lubricity of the graphite-loaded ceramic component. The desired strength and toughness of the sintered body may also affect the amount of graphite that is added. Preferably, the amount of graphite agglomerates 220 in the raw batch 268 is at least about 5 parts by weight, more preferably from about 5 parts by weight to about 10 parts by weight. It is believed that when the concentration of graphite greatly exceeds about 20 parts by weight, lamination can occur in the sintered ceramic body.

As an alternative to adding sintering aids 256 and additional additives 260 to the silicon carbide-containing liquid, the additives may be added directly to the raw batch 268 in the blending step 232. The blending step 232 is preferably performed in a cone blender, such as a PK blender.

As a result of the foregoing, the raw batch includes at least about 5 parts by weight graphite agglomerates wherein at least about 50 percent of the graphite agglomerates have a size of at least about 100 micrometers. The raw batch further includes at least about 80 parts by weight silicon carbide, and preferably at least about 85 parts by weight silicon carbide. Other components of the raw batch include the organic binders, sintering aids, and other additives used to facilitate processing.

The raw batch 268 is then pressed 272 into a green body 276 having a desired shape. The raw batch 268 can be pressed by any press known in the art, including a uniaxial press or an isostatic press In a uniaxial press, the raw batch 268 is placed in a die cavity and dry-pressed into the desired shape, resulting in the formation of a green body 276. Many configurations can be obtained by pressing, limited only by the shape-forming ability of the shaping device used. The raw batch 268 is preferably compacted at a pressure ranging from about 5 to about 25 ksi (34 MPa to 172 MPa). The green density of the green body 276 is preferably from about 1.8 g/cc to about 2.3 g/cc.

As will be appreciated by those skilled in the art of ceramic processing/the green body 276 can also be formed by other processes. For example, slip casting, tape casting, injection molding, isostatic pressing, or extrusion can all be used to form the green body 276.

The green body 276 is sintered 280 by heating the green body 276 to produce a graphite-loaded silicon carbide body 284. The sintering temperature affects the amount of shrinkage of the green body 276. Higher sintering temperatures generally increase shrinkage, which in turn affects the porosity of the sintered graphite-loaded silicon carbide component 284 (e.g., the diameter of the pores and/or porosity decrease upon shrinkage). Accordingly, lower sintering temperatures are desirable to produce a more porous body. Conversely, higher sintering temperatures are generally desired to produce a more dense and therefore stronger material. The graphite does not shrink during the sintering process to the same degree as the silicon carbide and the graphite is therefore slightly compressed by the shrinking silicon carbide during sintering.

It is preferred to sinter the graphite-loaded silicon carbide under reduced pressure. For example, the pressure is preferably less than about 40 torr and can also include an inert gas, such as flowing argon. However, the graphite-loaded silicon carbide can also be sintered in an overpressure of argon or nitrogen. Hot pressing or hot isostatic pressing can also be advantageous, such as at pressures up to about 30 ksi, to increase the density of the sintered ceramic body.

The duration of sintering 280 should be sufficient to produce the desired density of the graphite-loaded silicon carbide component 284. Preferably, the sintering temperature is from about 2050° C. to about 2200° C. and the sintering temperature is maintained for a period of from about 1 to about 10 hours, more preferably from about 1 to about 5 hours.

After sintering 280, the graphite-loaded silicon carbide component 284 is cooled to ambient temperature. Subsequent surface finishing, machining, or cutting can be performed if desired.

The component 284 preferably has certain properties depending upon the application of the component. Preferably, the component 284 has a tensile strength of at least about 100 MPa, and more preferably at least about 180 MPa. The density of the graphite-loaded silicon carbide is preferably at least about 2.6 g/cc, and more preferably is at least about 2.8 g/cc. Further since the graphite-loaded silicon carbide component is made by direct sintering of silicon carbide, the sintered body advantageously has a silicon metal content of less than about 0.5 weight percent, more preferably less than about 0.2 weight percent.

The wear rate should also be low. In one embodiment, a component produced according to the present invention has a wear rate of less than about 10 micro inch per day (0.0001) running against #5 carbon at 180 psi in water at 3500 rpm. #5 carbon has a low porosity and high elastic modulus. During the test, the carbon and the sintered graphite-loaded silicon carbide are in direct contact, under pressure and rotating.

The following example is provided by way of illustration and not by way of limitation.

EXAMPLE 1

A pump seal was fabricated according to the present invention.

Graphite powder having an average particle size of about 6 micrometers was obtained from Lonza, Inc. of Fair Lawn, N.J. (designation KS-6). 330 grams of the graphite powder was mixed with 825 grams of water and 17 grams of CARBOWAX binder obtained from Union Carbide of Danbury, Conn., and 2 grams of TAMOL-SN from Rohm-Haas of Philadelphia, Pa.

The slurry was mixed using a lightning mixer for about 1 hour to obtain a uniform mixture. The slurry was then injected into a spray dryer that was operating at a temperature of about 400° F. and produced substantially spherical agglomerates having an average size of about 150 micrometers.

Beta-phase silicon carbide powder was obtained from H. C. Starck, Inc. of Newton, Mass. and had an average particle size of about 1 micrometer. The silicon carbide powder was mixed in water with 0.5 weight percent boron and about 5 weight percent alpha-phase silicon carbide. Ammonia is also added to control the pH of the slurry. The silicon carbide slurry was atomized in a spray dryer at a temperature of about 400° F.

The graphite agglomerates and the silicon carbide particles were blended in a V-blender for about 1 hour to obtain a homogenous mixture. This mixture was then pressed at a pressure of about 20 ksi to form a green body having a density of about 1.9 g/cc.

The green body was sintered at a temperature of about 2150° C. under flowing argon for about 1 hour. Final density was about 2.95 g/cc and the shrinkage of the sintered body was about 11.5 percent. The flexural strength was from about 100 MPa to about 200 MPa and the fracture toughness is from about 3 MPam$^{1/2}$ to 4 MPam$^{1/2}$.

Although the preferred embodiments have been described by way of illustration and example, a number of variations and modifications of the invention, as known to those skilled in the art, can be practiced within the scope of the present invention.

What is claimed is:

1. A sintered ceramic body, comprising:
   (a) at least about 5 weight percent graphite inclusions having an average size of at least about 100 micrometers;
   (b) at least about 80 weight percent silicon carbide; and
   (c) less than about 0.5 weight percent unreacted silicon metal.

2. A sintered ceramic body as claimed in claim 1, wherein said sintered ceramic body comprises from about 5 weight percent to about 10 weight percent graphite inclusions.

3. A sintered ceramic body as claimed in claim 1, wherein at least about 50 percent of said graphite inclusions have a size of at least about 100 micrometers.

4. A sintered ceramic body as claimed in claim 1, wherein said graphite inclusions have an average size of from about 100 micrometers to about 150 micrometers.

5. A sintered ceramic body as claimed in claim 1, wherein said sintered ceramic body comprises at least about 85 weight percent silicon carbide.

6. A sintered ceramic body as claimed in claim 1, wherein said sintered ceramic body has a density of at least about 2.8 g/cc.

7. A sintered ceramic body as recited in claim 1, wherein said sintered ceramic body has a tensile strength of at least about 180 MPa.

8. A sintered ceramic body as recited in claim 1, wherein said sintered ceramic body comprises less than about 0.2 weight percent silicon metal.

9. A sintered ceramic body as claimed in claim 1, wherein said sintered ceramic body is a pump seal.

10. A sintered ceramic body, comprising:
    (a) from about 5 weight percent to about 10 weight percent graphite inclusions having an average size of from about 100 micrometers to about 150 micrometers;
    (b) at least about 85 weight percent silicon carbide; and
    (c) less than about 0.5 weight percent unreacted silicon metal; wherein the density of said sintered ceramic body is at least about 2.6 g/cc.

11. A sintered ceramic body as claimed in claim 10, wherein said sintered ceramic body has a tensile strength of at least about 100 MPa.

12. A sintered ceramic body, comprising:
    (a) at least about 85 weight percent silicon carbide;
    (b) at least about 5 weight percent graphite inclusions having an average size of at least about 100 micrometers; and
    (c) less than about 0.5 weight percent unreacted silicon metal;
    wherein said sintered ceramic body has a density of at least about 2.8 g/cc and a tensile strength of at least about 100 MPa.

13. A sintered ceramic body as claimed in claim 12, wherein said sintered ceramic body has a tensile strength of at least about 180 MPa.

* * * * *

UNITED STATES PATENT AND TRADEMARK OFFICE
CERTIFICATE OF CORRECTION

PATENT NO.  : 5,486,496
DATED       : January 23, 1996
INVENTOR(S) : Talbert et al.

It is certified that error appears in the above-identified patent and that said Letters Patent is hereby corrected as shown below:

On the Title page, item [75];

In the designation of Inventors,
    please change "Stephen" to --Steven--.

Signed and Sealed this

Third Day of September, 1996

Attest:

BRUCE LEHMAN

*Attesting Officer*            *Commissioner of Patents and Trademarks*